United States Patent

[11] 3,602,892

[72] Inventors Kermit A. Norris
Azusa;
William R. Goodale, Claremont, both of, Calif.

[21] Appl. No. 813,826
[22] Filed Apr. 7, 1969
[45] Patented Aug. 31, 1971
[73] Assignee Leach Corporation
San Marino, Calif.

[54] MULTITRACK HIGH BIT DENSITY RECORD AND REPRODUCE SYSTEM
33 Claims, 13 Drawing Figs.

[52] U.S. Cl. 340/172.5
[51] Int. Cl. G11b 5/00
[50] Field of Search 340/172.5, 174.1

[56] References Cited

UNITED STATES PATENTS

| | | | |
|---|---|---|---|
| 3,286,243 | 11/1966 | Floros | 340/174.1 |
| 3,395,399 | 7/1968 | Goodenow | 340/172.5 |
| 3,417,378 | 12/1968 | Simonsen | 340/172.5 |
| 3,423,744 | 1/1969 | Gerlach | 340/174.1 |
| 3,427,591 | 2/1969 | Nishioka | 340/172.5 |
| 3,488,663 | 1/1970 | Rosenblatt | 340/174.1 X |

*Primary Examiner*—Paul J. Henon
*Assistant Examiner*—R. Chapuran
*Attorney*—Jackson & Jones

ABSTRACT: A system for recording bit densities of 6,000 to 16,000 bits per linear inch per track and higher, is described wherein parallel track recording is employed. At such high densities, extreme data alignment problems are presented due to static and dynamic skew from one track to another. In the disclosed invention, each track of serial data includes its own synchronizing signal that is recorded coherently with useable data signals. The synchronizing signal has a bit cell duration different from the bit cell duration allotted to useable data. This bit cell duration difference is decoded at the reproduce location and indicates that useable data is immediately following. Each track also has associated therewith at the reproduce location, a multibit buffer which receives data for that track asynchronously with respect to the other tracks. Each track's input addressing and input bit shifting within each track's multibit buffer is controlled by a clock signal derived from the recovered data for that track after that track's own synchronizing signal has been decoded. Each track's buffer has sufficient capacity to store several multibit data words in one portion of the buffer, while another portion of that buffer is available for output data addressing and output data shifting. Data readout from all of the buffers is provided under control of one arbitrarily selected track at the reproduce station which is designated as a "master track." That track's synchronizing signal, and that track's derived clock signal, are employed to synchronously output data in parallel from all of the buffers.

INVENTORS.
KERMIT A. NORRIS
WILLIAM R. GODDALE
BY
Jackson + Jones
ATTORNEYS

MULTITRACK HIGH BIT DENSITY RECORD AND REPRODUCE SYSTEM

CROSS-REFERENCES TO RELATED APPLICATIONS

This application relates to a patent application entitled "High Bit Density Record and Reproduce System" having Ser. No. 592,458 filed Nov. 7, 1966 by inventor Kermit A. Norris and now issued as U.S. Pat. No. 3,518,648 assigned to the same assignee as the present invention.

This application also relates to a patent application entitled "Derived Clock Circuit In A Phase Modulated Digital Data Handling System," having Ser. No. 715,098 filed Mar. 21, 1968 by Kermit A. Norris and assigned to the same assignee as the present invention.

This application also relates to a patent application entitled "Split-phase Adaptive Decoding Electronics," by Kermit A. Norris, having Ser. No. 766,531, filed Oct. 10, 1968, and assigned to the same assignee as the present invention.

BACKGROUND OF THE INVENTION

1. Field of the Invention

The field of the invention includes high-density computer applications for business machines and the like. The techniques of this invention have specific application for utilization with satelite systems wherein a great deal of data must be received asynchronously in multitrack parallel form and gated out in synchronous multitrack parallel form.

2. Description of the Prior Art

In the prior art it has been commonplace to convert series information from a number of inputs to a parallel format for storage on a plurality of parallel tracks on a magnetic medium. In the prior art, bit densities have generally been in the order of 800 to 1,600 bits per linear inch per track. At such densities it is commonplace to write at least one and, sometimes, several parallel beginning-of-message synchronizing bits across the magnetic medium in advance of useable data. The useable data is also stored in parallel format on the medium. Similar parallel end-of-message synchronizing bits normally follow the useable data. Such mechanical synchronizing techniques are feasible at low densities because the amount of dynamic and static skew of the various tracks relative to each other is normally only a small portion of a bit cell duration. In other words, skew shifts are absorbed by a small linear portion of the parallel instantaneous segment of the magnetic medium's width which is to receive the recorded signals.

By static skew it is here understood to mean the amount of spacial misalignment from one track to the next which results from mechanical misalignment always present in the gap positions on multigap read and write heads. By dynamic skew it is here understood to mean the additional spacial misalignment which flutter, wow, vibration, and temperature variations introduce into the system between the time that a record is written and the time that such a record is recovered.

In the prior art systems at low bit densities, the dynamic skew normally has a frequency component which tends to interfere significantly with the data's frequency, or repetition rate. Accordingly, dynamic skew has received more attention in the prior art than has static skew. Typical techniques for overcoming dynamic skew problems have included the utilization of servo loops which attempt to vary the playback speed of the magnetic medium so as to compensate for dynamic skew. Such systems are complex. In addition, although tending to compensate for the dynamic skew, such prior art systems do not serve to correct for any significant amount of static skew.

At low bit densities, as mentioned above, static skew generally represents only a fixed portion of a relatively long duration bit cell interval, as compared to the short duration bit cell of the high bit densities of this invention. To pick a typical prior art example, consider a packing density of 800 bits per inch per track. A bit cell has associated on the magnetic medium a linear space equal to 1/800 or 1,250 microinches. Total maximum skew of 500 to 600 microinches is less than one-half of an assigned bit cell. Such skew may be compensated for by complex prior art servocontrol techniques.

In contrast, at a packing density in accordance with this invention, in the order of 10,000 bits per linear inch per track, the bit cell has associated on the magnetic medium a linear space of only 100 microinches. We have discovered that present-day multitrack record heads exhibit gap variations from track to track of at least a few hundred microinches. Accordingly, at the density levels contemplated by the instant invention, static skew within the record head alone may displace the first (and following bits) of one track, several bit cell locations away from the first (and following bits) of another track. The reproduce heads also exhibit similar gap misalignment. The gap misalignment for a given track on both a record and a reproduce head may, in a worst case, be additive. In such instances, the total static skew may amount to five or six bit cell locations. In further contrast to the prior art, we have discovered that the dynamic skew problems which have heretofore received primary attention at the lower prior art frequencies, diminish in severity at high bit densities. Inasmuch as the wow and flutter frequency components are at a low frequency relative to the bit frequency, it is rare, indeed, for system anomalies to introduce additional dynamic skew of more than one or two bits. Static and dynamic skew as described, is adequately handled by the techniques of this invention.

SUMMARY OF THE INVENTION

Serial digital data of binary ONES and ZEROS is recorded with guaranteed signal transitions at least at the bit cell boundaries. One given binary value, such as a ONE, is assigned an additional midbit transition. The useable data has a fixed repetition rate, i.e., a fixed bit cell duration as defined by the desired data rate. A synchronizing signal for such data has a repetitive bit cell duration which is greater than that of the useable data. Otherwise stated, the synchronizing rate is slower than the data rate. The synchronizing signal also has guaranteed signal transitions at its bit cell boundaries with an additional midbit transition.

A synchronizing signal, a START signal, data signals, and a STOP signal are all recorded coherently. The START signal comprises at least one binary ONE at the data rate. This START signal is recorded immediately after the last one of a plurality of synchronizing signals are recorded at the synchronizing rate, and immediately before the first useable data bit, at the data rate. In multitrack parallel operation a similar synchronizing signal and a STOP signal are also coherently recorded immediately after the last useable data bit on each track of data. Means are provided at the record channel for coherently shifting from the synchronizing signals to the START and STOP signals and to the useable data signals.

At the reproduce location, each track is provided with an individual reproduce channel which includes a decoder. All decoders include first and second phase comparison circuits. The first comparison circuit decodes data signals. Its input signals are a nondelayed signal recovered from a magnetic medium and that same recovered signal delayed by one bit cell duration at the data rate. In one preferred embodiment, the bit cell duration for the synchronizing signal is one and one-half times that of the useable data's bit cell duration. The second phase comparison circuit decodes the synchronizing signal. This second phase comparison circuit also receives the one recovered nondelayed signal, and further receives the same signal delayed by 1½ bit cell durations at the data rate.

A pair of desliver filters are provided for each decoder. One filter each is connected to the first and to the second phase comparison circuits. These filters compensate for inherent phase distortion in the system and remove noise slivers purposely introduced by our synchronizing signals. When a synchronizing signal of sustained duration is received, it is decoded as a sustained ZERO level by the first comparison circuit, and it is decoded as a sustained ONE level by the second comparison circuit. Noise slivers in these sustained ZERO and ONE levels are removed by the filters. Sustained ZERO and ONE levels are recognized by logic circuitry as a valid synchronizing signal. The first data ONE after the beginning-of-data synchronizing signal is decoded as a START command by the first phase comparison circuit. The START command clears that track's input addressing circuit, and that track's multibit buffer as well. A clock circuit for each track derives a clock from the transitions of the nondecoded (i.e., S$\phi$M) data signal. Each track's derived clock is used for sequencing the input addressing and for shifting the multibit buffer for that track. During the parallel track operation, one track's START command and that track's derived clock signal is employed as master signals for synchronously controlling all output addressing and output shifting for all track's buffers including the master track. Means are provided for comparing the speed at which input data bits fill a portion of the master track's buffer, with the speed at which bits are being outputted from another portion of the master buffer. A voltage is emitted by the speed comparison means. Voltage applying means are connected from the emitting means to an oscillator circuit which varies its clock output so as to keep the master buffer essentially half full at all times. All of the other track's buffers are also substantially half full, with the understanding, of course, that the total amount of skew in bits will of necessity dictate that some track's buffer content varies above and below the half-full point. After an entire data block has been received and decoded, the end-of-message synchronizing signal is received at the reproduce location. This end-of-message synchronizing signal is decoded. The STOP signal is decoded thereafter and it is employed to latch up an input address memory. A comparator senses the continuing output addressing operation. During receipt of the end-of-message synchronizing signal and the STOP command, unintelligible data is inputted into each reproduce channel's buffer. The comparator monitors outputting of useful data only. It stops each track's outputting when the first bit of unintelligible data is shifted to the output stage of each track's buffer.

DESCRIPTION OF THE PREFERRED EMBODIMENTS

Figure 1:
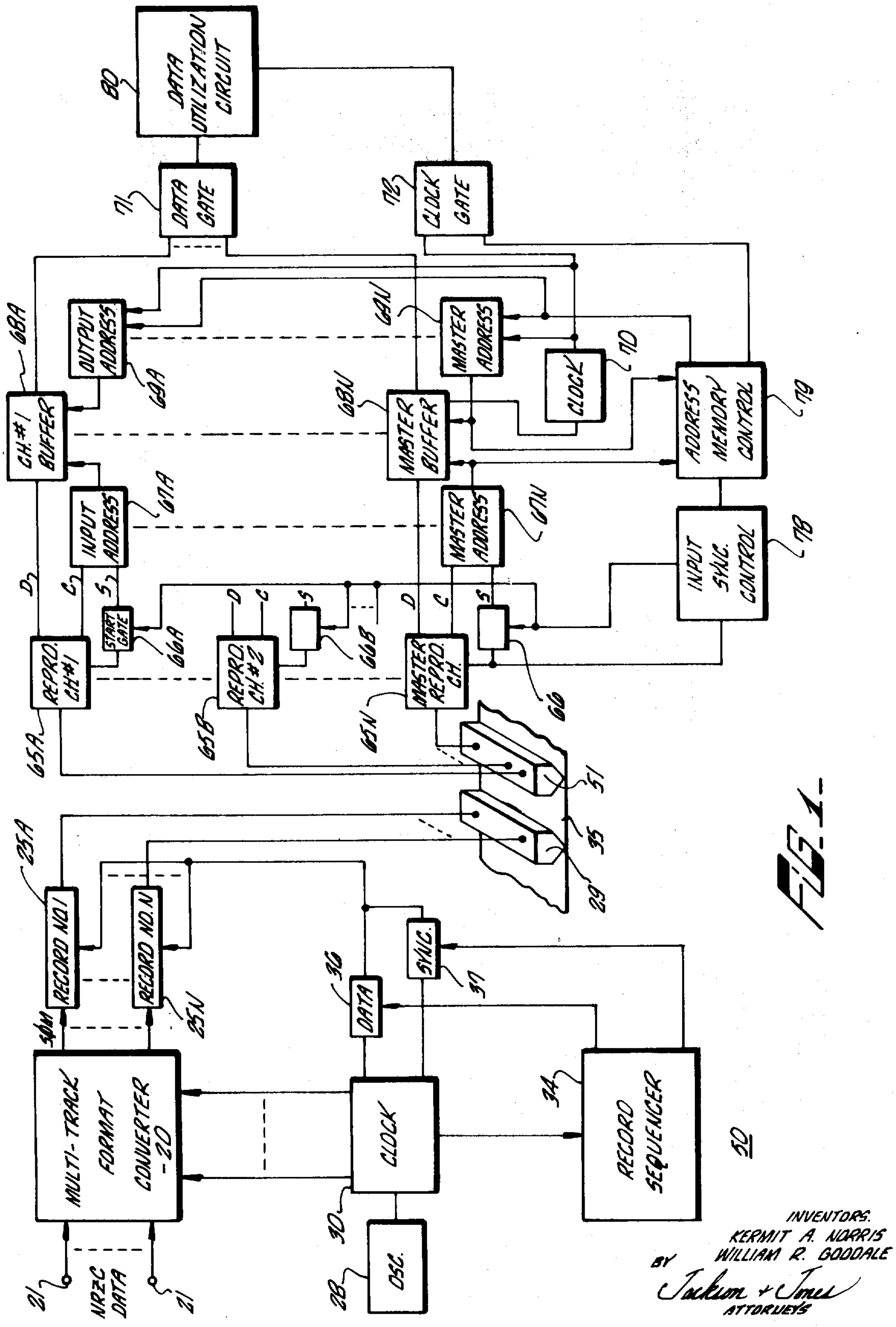
FIG. 1 depicts a block diagram of a parallel track record and reproduce system in accordance with this invention.

Turning now to the drawing of FIG. 1, a multitrack format converter 20 is shown at record channel 50 receiving a plurality of parallel data signals at its input terminals 21. The data applied to the multitrack converter circuit 20 may advantageously be nonreturn-to-zero change (NRZC) data. In accordance with the principles of this invention, such NRZC data is converted by converter 20 to a split-phase-mark (S$\phi$M) format. The S$\phi$M data is applied to individual record channels 25A–25N. Each of these channels include suitable amplifiers for applying such S$\phi$M signals to a parallel track record head 29. Record head 29 may be any typical multitrack magnetic recording head. We have found unusual advantages in employing coherent nonsaturating analog S$\phi$M signals recorded on a magnetic medium via analog recording heads, as contrasted to normal pulse saturation recording via digital saturation-recording heads.

Figure 1A:
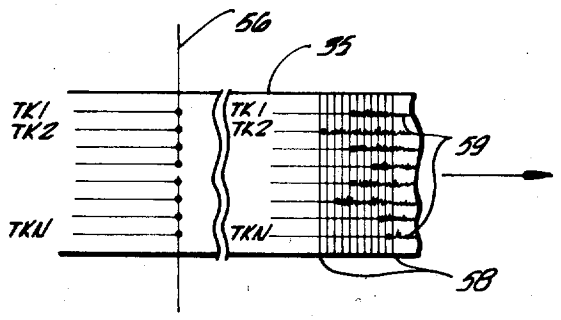
FIG. 1A depicts a segment of magnetic tape with parallel tracks illustrating the skew problems solved by this invention.

Prior to discussing further the recording techniques employed in the recording channel 50 of FIG. 1, brief reference is made to the segment of magnetic tape 35, of FIG. 1A, which tape is one typical nonlimiting example of a magnetic recording medium. In FIG. 1A an axis 56 is drawn transverse to the direction of motion of the magnetic tape 35. If all gaps in the record and reproduce heads were aligned perfectly the first bit of the tracks TK.1, TK.2, through TK.N, would appear exactly on the transverse axis 56 (discounting for the moment bit shifts introduced by dynamic skew). Such theoretical alignment, however, is not available from standard apparatus.

Under practical operating conditions at high bit densities, typical static and typical dynamic skew may cause as much as 10-bit cell duration shifts from one track to another. Such worst-case conditions are depicted symbolically at the right-hand portion of the magnetic medium 35 in FIG. 1A wherein a plurality of parallel lines 58 indicate symbolically the parallel tape portions allotted to given bit cell locations.

Each of the parallel tracks TK.1 through TK.N recorded on the magnetic tape 35 is depicted with a solid dot located between various ones of the parallel lines 58. These dots symbolically indicate the first bit recorded in each one of the parallel tracks. Comparison between the first bit of track No. 2 (TK.2) and the first bit of track No. N (TK.N) discloses that there is a total of 10-bit cell shifts between the first bits of these two tracks.

It should be understood that the above-mentioned bit cell shifts result from a combination of dynamic, as well as static skew. In the light of such drastic bit cell shifts, it is readily apparent that parallel synchronization techniques of the prior art cannot hope to solve the problems associated with high bit density recordings.

As will be described in more detail hereinafter, the decoding techniques of this invention may yield spurious clock and data signals in response to noise on the magnetic medium in track areas are not utilized by actual recorded signals. Noise 59 is symbolically shown in FIG. 1A as preceding the dots between the parallel lines 58. Noise 59 prevents the utilization of prior art phase-locked oscillators in the reproduce channels because the spurious clock signals tend to trigger the oscillator and associated data storage equipment at incorrect times. In addition, spurious data levels resulting from noise may tend to be identified as valid data by the reproduce equipment of the prior art. The features of this invention include a unique signal format together with unique record and reproduce circuitry which tends substantially to reduce any possibility that spurious clock or data signals can be prematurely interpreted as recorded information.

The foregoing and other general features of our invention will now be described in more detail by returning again to the drawing of FIG. 1. At record channel 50, an oscillator 28 is employed to drive a clock circuit 30. The clock circuit 30 emits a square wave having a frequency which is equal to the bit rate to be recorded. The output of clock circuit 30 consists of a square wave signal having a transition at each bit cell boundary plus an additional midbit transition. There is one such clock signal provided by clock circuit 30 for each track of NRZC data to be converted by circuit 20 to $S\phi M$ data.

One suitable NRZC to $S\phi M$ converter 20 is described in the aforementioned patent application entitled "High Bit Density Record and Reproduce System." Also described therein is a recording technique in which the $S\phi M$ signals are filtered in the record channels 25A through 25N for application to a magnetic medium as a coherent analog wave form. In such a format, a data ONE is represented by a complete cycle within a bit cell duration; whereas, a binary ZERO is represented by a coherent analog signal having one-half of a cycle in a bit cell duration. Stated in another way, assume that the bit density to be recorded is selected at 10,000 bits per inch per track at a tape speed of 10 inches per second. For this assumption, a repetitive string of data ONES in $S\phi M$ format is represented by a 100 kc. signal whereas, a repetitive string of ZEROS would be represented by a 50 kc. signal. It is understood, of course, that ZEROS and ONES appear at random in data trains and, thus, $S\phi M$ data signals for the assumed example, are a continuous signal consisting of 50 kc. and 100 kc. signal components.

A record sequencer circuit 34 is provided in FIG. 1. This circuit 34 assures coherency in all signals to be recorded by channels 25A through 25N in accordance with our system format. Coherency is achieved through selective enablement of either a data gate 36 or a sync gate 37.

Figures 3, 3A:
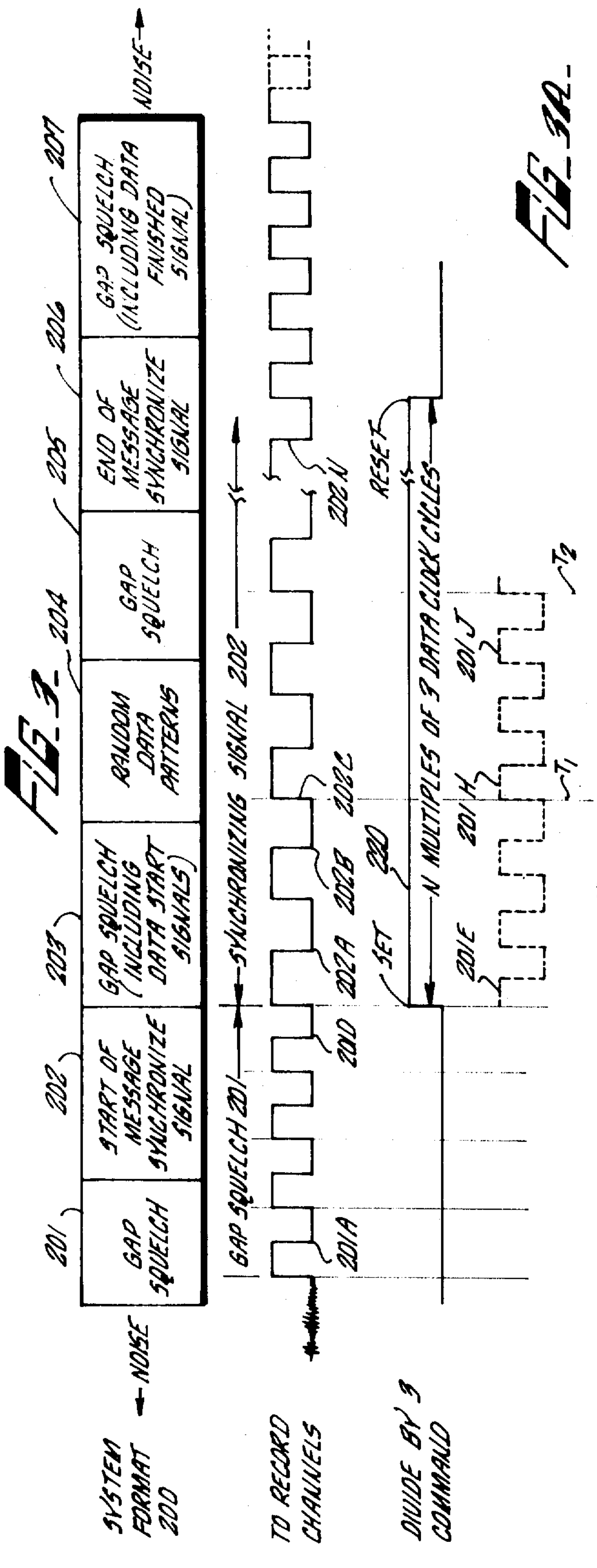
FIG. 3 depicts a signal format for each track in accordance with this invention.
FIG. 3A is a pulse and wave form chart useful in promoting a clearer understanding of FIGS. 1, 2, and 3.

FIG. 3 discloses the system format 200 employed in accordance with the principles of our invention. A gap squelch signal 201 is preceded by noise. To avoid any possible errors which may be introduced by such noise, gap squelch signal 201 is recorded at the data rate. This signal 201 may comprise any given number of an arbitrary bit value such as a given number of ONES, for example. The first gap squelch signal 201, as shown by FIG. 3A may include four ONES, 201A through 201D.

A synchronizing signal 202 follows gap squelch 201, FIG. 3. Synchronizing signal 202 may include a given number of cycles 202A through 202N as shown in FIG. 3A. Each full cycle has a bit duration different from that assigned to the data. As shown in FIG. 3A the bit duration of each cycle of a synchronizing signal is 1½ times the bit cell duration assigned to the data and to the gap squelch signals.

Record sequencer 34, FIG. 1 enables data gate 36 during the gap squelch period 201, FIG. 3, to supply to the record channels 25A through 25N, four clock cycles 201A through 201D at the data rate. These clock signals 201 correspond to four ONES in a data train, and thus are referred to as ONES. Record sequencer 34, in response to the clock signal from clock circuit 30, coherently shifts, at the conclusion of gap squelch 201, FIG. 3A, to the sync signal 202, FIG. 3A. Record sequencer 34 thus supplies, at the proper instant, the sync signal 202 to the record channels by disabling the data gate 36 and enabling sync gate 37, FIG. 1.

As mentioned above, in accordance with one preferred embodiment of this invention, we have elected to have the bit-cell duration of the sync signal equal to 1½ times the bit cell duration assigned to the data. This particular sync signal bit-cell duration is employed in a unique manner at the decoder locations for parallel track synchronization as will be described in more detail hereinafter.

It is necessary that the gap squelch signals, the sync signal and the data signals all be coherent with one another even though the bit-cell duration for the sync signal is 1½ times the bit-cell duration for the other signals. This coherency is obtained by the circuitry of FIG. 2 wherein record sequencer 34 is repeated as is the oscillator 28. Oscillator 28 may conveniently have a frequency output of 10 times the bit rate in cycles per second. Connected to the output of oscillator 28 are two tandem divider circuits 31 and 32 which may be any conventional type known to the art. Divider circuit 31 is a divide-by-5 circuit; whereas, divider circuit 32 is a divide-by-2 circuit. The two divider circuits 31 and 32 thus provide, assuming 10,000 bits per inch, a 100 kc. input signal to gate 36. The clock output from gate 36 is the data rate for the selected example. This clock output is also applied to record sequencer 34 as a synchronizing signal.

At the junction between divider circuits 31 and 32, is connected a divide by 3 circuit 33. The output signal from circuit 33 is applied to logic gate 37. This output signal has a frequency which is 0.666 of the data frequency outputted by divider 32. Divider circuit 33 is clocked at the data rate by record sequencer 34 to assure coherency. Record sequencer 34 selectively controls either the data gate 36 or the sync gate 37. Connected to the output of gates 36 and 37 is an OR circuit 38 which supplies either the data rate signal or the synchronizing rate signals to individual record channels 25A through 25N of FIG. 1.

As shown in FIG. 3A record sequencer 34 achieves coherency between the last cycle 201D of the gap squelch signal and the first cycle 202A of the start-of-message synchronizing signal 202. Thus, sequencer 34 emits at the trailing edge of cycle 201D a divide-by-3 command 220, FIG. 3A, which inhibits signal passage through gate 36 and enables signal passage through gate 37. Thereafter, the synchronizing signal at a frequency of 0.666 of the data frequency is gated to all record channels 25A through 25N through the enabled sync gate 37.

Record sequencer 34 includes a clock counter circuit (not shown but of any conventional type) which counts a predetermined number of sets of three clock cycles per set. Three full clock cycles at the data rate are used to achieve coherency with two full cycles of the synchronizing signal at the synchronizing rate. This coherency is shown by the dashed cycles 201E through 201J, FIG. 3A. Note that after three cycles of clock signal, at time $T_1$, the leading edge of synchronizing signal 202C is coincidental with a leading edge of a clock signal 201H. Thereafter, the two signals are out-of-phase relative to one another for three more full clock cycles until at time $T_2$ the leading edges of both signals again coincide. Accordingly, after any given multiple of three full data clock cycles have been counted by the record sequencer 34, the sync gate 37 is disabled and the data gate 36 is enabled. This technique thus provides coherency between all signals of 201 through 207 of the system format 200 of FIG. 3.

Figure 2:
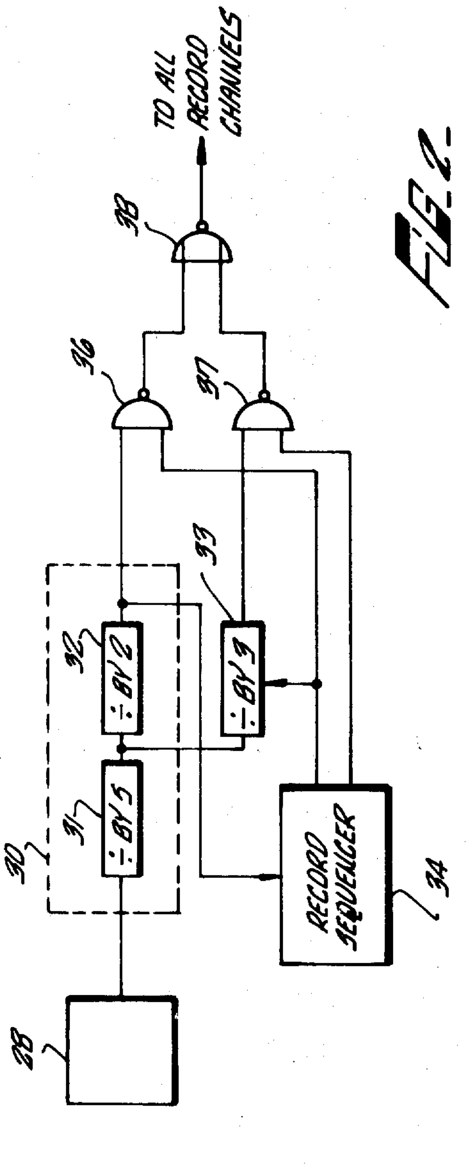
FIG. 2 depicts a block diagram and circuit schematic useful for coherently shifting from synchronizing signals of a given bit cell duration to another different bit cell duration assigned to START, STOP and data signals in accordance with this invention.
Figure 5:
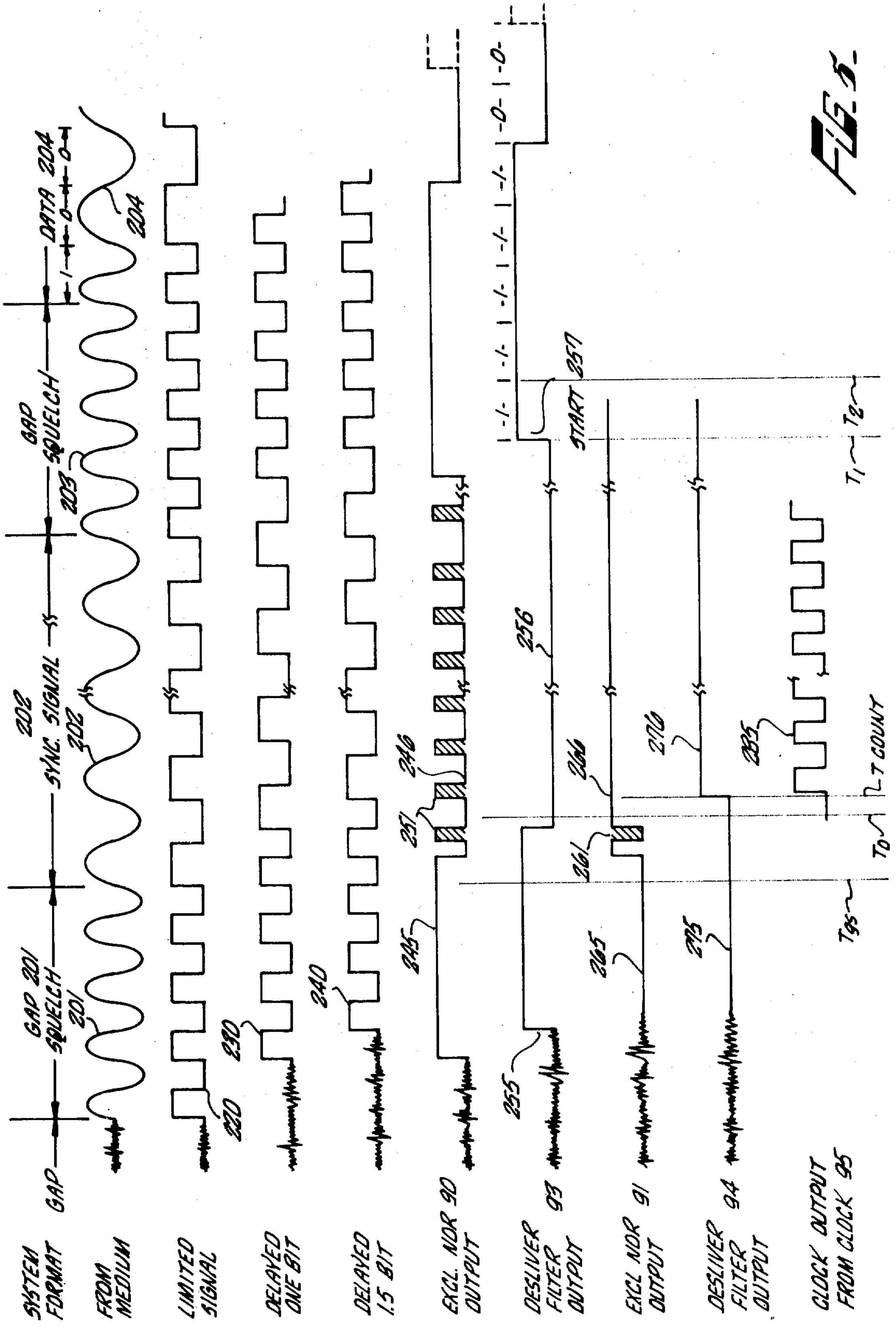
FIG. 5 is a pulse and wave form chart useful in promoting a clearer understanding of certain of the figures herein including FIG. 4.

Returning to FIG. 1, a reproduce head 51 is positioned to recover each channel's signal format stored on the magnetic medium 35 in the manner described hereinbefore by reference to FIG. 2, 3 and 3A. Reproduce head 51 has connected thereto a plurality of reproduce channels 65A through 65N. These reproduce channels are each adapted to recover and amplify analog signals from reproduce head 51. One portion of the signal format of FIG. 3 is repeated in the first two rows of FIG. 5. The second row of FIG. 5 depicts an analog version of gap squelch signals 201 and 203, synchronizing signal 202 and binary data signals 204. In each reproduce channel the recovered analog signals are hard limited to restore them to a square wave signal of the form of the third row in FIG. 5.

Figure 4:
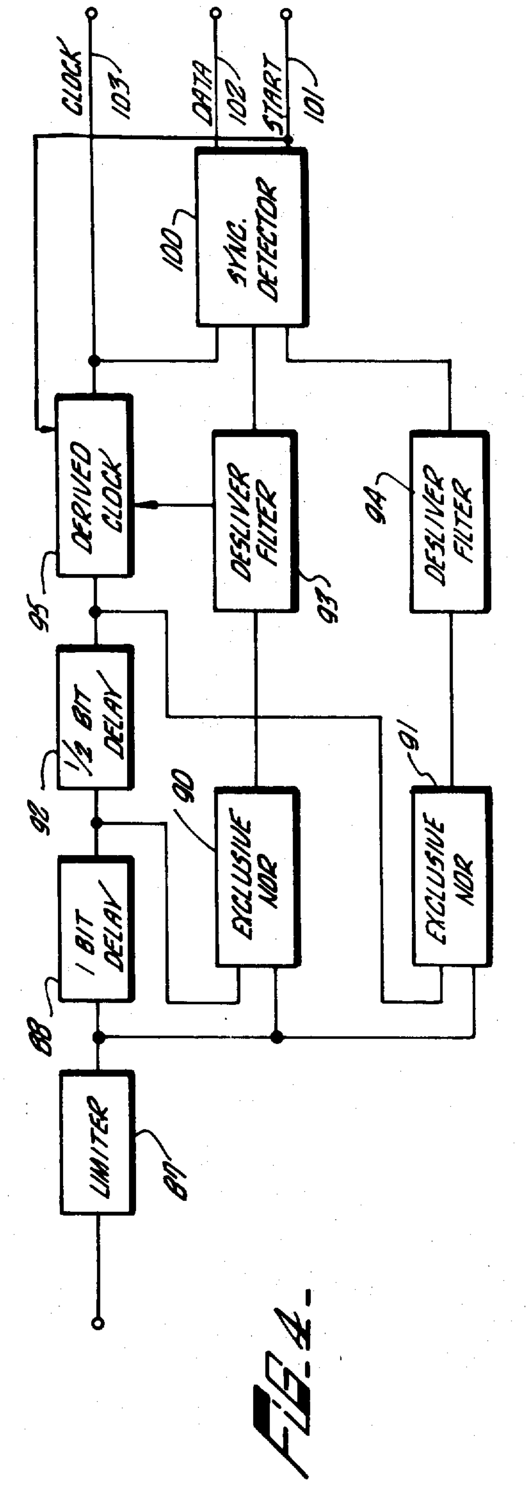
FIG. 4 is a block diagram of a decoder for one reproduce channel in accordance with this invention.

Each one of the reproduce channels 65A through 65N includes the circuitry depicted in FIG. 4. Reference is now made to FIGS. 4 and 5 in order to define the system operation for recognizing the synchronizing and message start signals of this invention.

In FIG. 4 a limiter circuit 87, which may be any well-known type, is employed to convert the analog waveform, row two of FIG. 5, to a square wave signal of row three, FIG. 5. The output of limiter circuit 87 is applied directly to a one bit delay circuit 88, and to a pair of exclusive NOR circuits 90 and 91. Delay circuit 88 as shown by comparison of wave forms 220 and 230, FIG. 5, delays the limited signal 220 by one data bit cell duration. Connected in tandem to the one bit delay circuit 88 is a ½-bit delay circuit 92. The signal output from delay 92 is signal 240, FIG. 5. These delay circuits 88 and 92 may be digital or analog delay circuits. If analog delays are employed the analog signal of row two of FIG. 5 is delayed prior to limiting and after limiting is applied to exclusive NOR circuits 90 and 91. Clocked digital delay circuits are described in a copending patent application, Ser. No. 766,531, entitled "Split-Phase Adaptive Decoding Electronics," filed Oct. 10, 1968.

Exclusive NOR circuit 90 has for its inputs the limited signal 220 and a one bit delayed signal 230. Comparison of these two signals yields a NRZC format directly from the split-phase mark signal. Such a NRZC decoded format for the four "ONES" of the gap squelch period 201 is shown at 245, FIG. 5. After the gap squelch period 201 has been decoded by exclusive NOR circuit 90, the sync signal 202 is also delayed by one bit period. A comparison between the nondelayed sync signal 202, FIG. 5 and a one bit delayed version of itself is decoded by exclusive NOR circuit 90 as a ZERO level 246, FIG. 5. This level 246 includes noise spikes 251 shown shaded. The spikes 251 are emitted from exclusive NOR circuit 90, because of phase difference between the two input signals. Connected to the output of exclusive NOR 90 is a desliver filter 93. This desliver filter 93 removes the shaded noise slivers 251. Filter 93 thus yields, as shown in FIG. 5, an output signal 255 having a high level for the four ONES of the gap squelch signal 201 and a low level 256 for the duration of sync signal 202.

The input signals applied to exclusive NOR circuit 91 are the limited signal 220 and the 1½-bit delayed signal 240, FIG. 5. Comparison of these two signals for the gap squelch period 201 yields a ZERO output 265 of NRZC format. When the sync signal 202 appears, after being delayed 1½ bits duration, the exclusive NOR circuit 91 is decoding, in fact, one bit cell duration at the sync rate. Accordingly, as soon as the nondelayed sync signal is compared with itself delayed by 1½ bit periods, the exclusive NOR circuit 91 interprets the sync signal as a continuous ONE or HIGH level output 266, FIG. 5. During the interim between the decoded gap squelch signal 265 and the decoded sync signal 266 a phase discrepancy exists which yields a noise sliver 261 shown shaded. Connected to the output of exclusive NOR 91 is another desliver filter 94 which removes that noise sliver 261 and yields the signal 275–276, FIG. 5.

Connected to the output of the desliver filters 93 and 94 is a sync detector circuit 100. This sync detector 100 is adapted to respond to an extended duration ZERO at the output of desliver filter 93 which is coincident with an extended duration ONE output from desliver filter 94. Once this extended duration sync signal 202 has been detected by circuit 100, it is further adapted to respond to a selected ONE signal in gap squelch period 203 so as to emit a START command on output lead 101. This START command from sync detector 100 readies the reproduce equipment for receiving, decoding, and synchronizing data signals 204 which follows the gap squelch signal 203, FIG. 5. A train of decoded data pulses appears on lead 102. A data clock signal is available at lead 103.

The data clock signal is a derived clock signal obtained by a derived clock circuit 95. The derived clock circuit 95 selects particular transitions from the S$\phi$M signal emitted from delay circuit 92. The decoded data levels (i.e., NRZC) are applied by desliver filter 93 to clock circuit 95. The decoded data serves as a gating or inhibit signal for derived clock circuit 95. One suitable derived clock circuit 95 is described in the foregoing referenced patent application entitled "Derived Clock Circuit In A Phase Modulated Digital Data Handling System."

Figure 6:
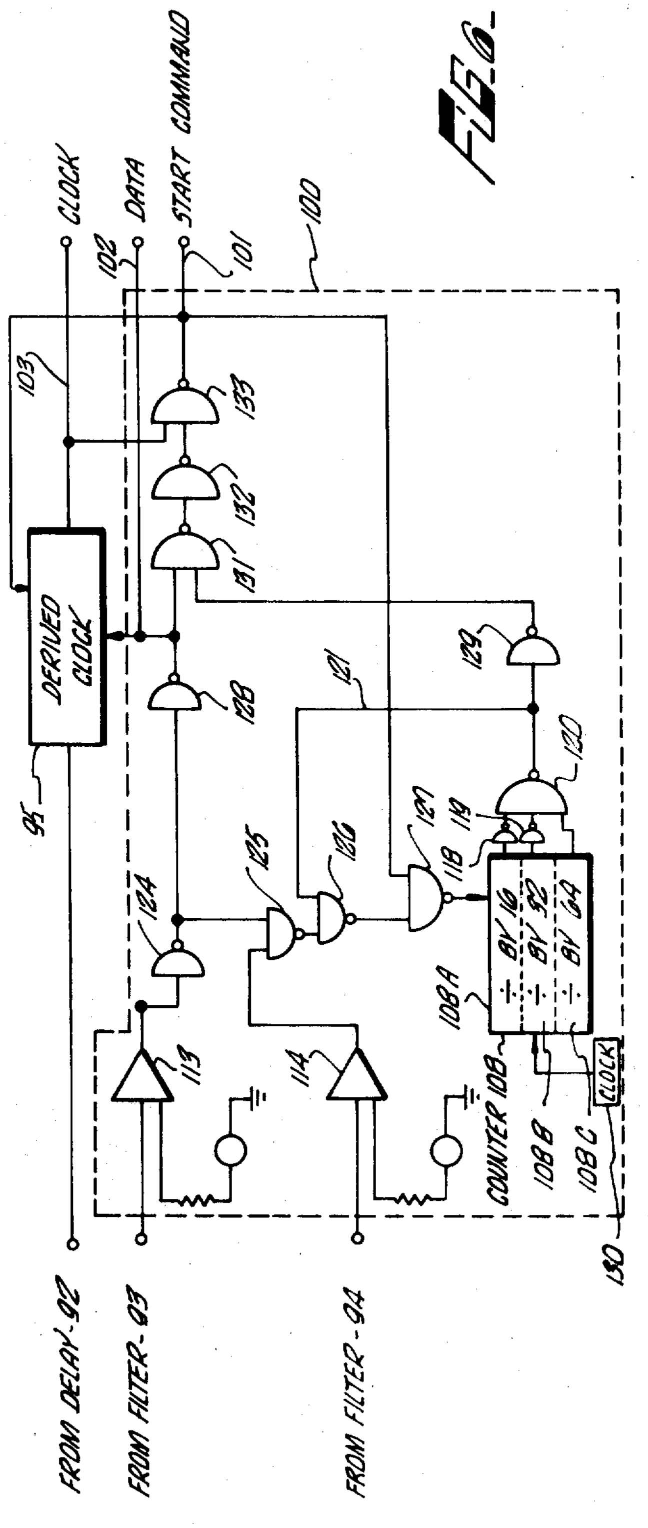
FIG. 6 is a combined block diagram and logic schematic of the synchronzing signal detector of FIG. 4.

One suitable type of sync detector 100 is shown in FIG. 6 wherein the derived clock circuit 95 is also repeated for clarity purposes. As shown in FIG. 6 the outputs from filters 93 and 94 are applied to comparator amplifiers 113 and 114 respectively. In such an instance, it has been assumed that the desliver filters 93 and 94 are analog filters designed to pass the highest data frequency component, and to block passage of the much higher frequency components represented by the noise slivers 251 and 261, FIG. 5. The comparator amplifiers 113 and 114 restore the analog filter output signals in conventional comparator operation to a square wave signal such as that shown by wave forms 225, 256 and 275 and 276, FIG. 5.

Sync detector circuit 100, shown in dashed lines in FIG. 6, senses the extended duration ONE from desliver filter 94 coincident with a ZERO of equal extended duration from desliver filter 93. These extended duration signals are a valid sync signal. The first ONE or START signal 257, FIG. 5, is thereafter detected and a START command is emitted at lead 101 by detector 100.

As shown in FIG. 6, detector 100 includes a counter 108 which has, as its input, a signal delivered by the output of clock circuit 130, which may be any standard clock circuit supplying a controlled time signal. Starting at time $T_0$ as shown in FIG. 5, the ZERO output from filter 93 after double inversion by two NAND gates 124 and 128 is supplied as a ZERO control level to derived clock circuit 95.

The normal output signal from desliver filter 93 (i.e. in the absence of a synchronizing signal) is a decoded random data signal. These data levels of the decoded data signal select and inhibit certain transitions of the S$\phi$M signal. For example, if the desliver filter 93 applies ZERO or LOW level signals to derived clock circuit 95 then both direction transitions of the S$\phi$M output from delay 92 are selected. If, on the other hand, ONES are applied to clock circuit 95, then only certain transitions are selected, and certain other transitions are inhibited.

Complete operational details of the derived clock circuit 95 are fully described in the foregoing mentioned application and need not be repeated here. Briefly, however, derived clock circuit 95, starting at time $T_0$, FIG. 5, receives an extended duration ZERO level as a control signal from filter 93, amplifier 113, and NAND gates 124 and 128. This ZERO level, as described above, selects every transition (i.e. both leading and trailing edges) from signal 240, FIG. 5.

Figure 7:
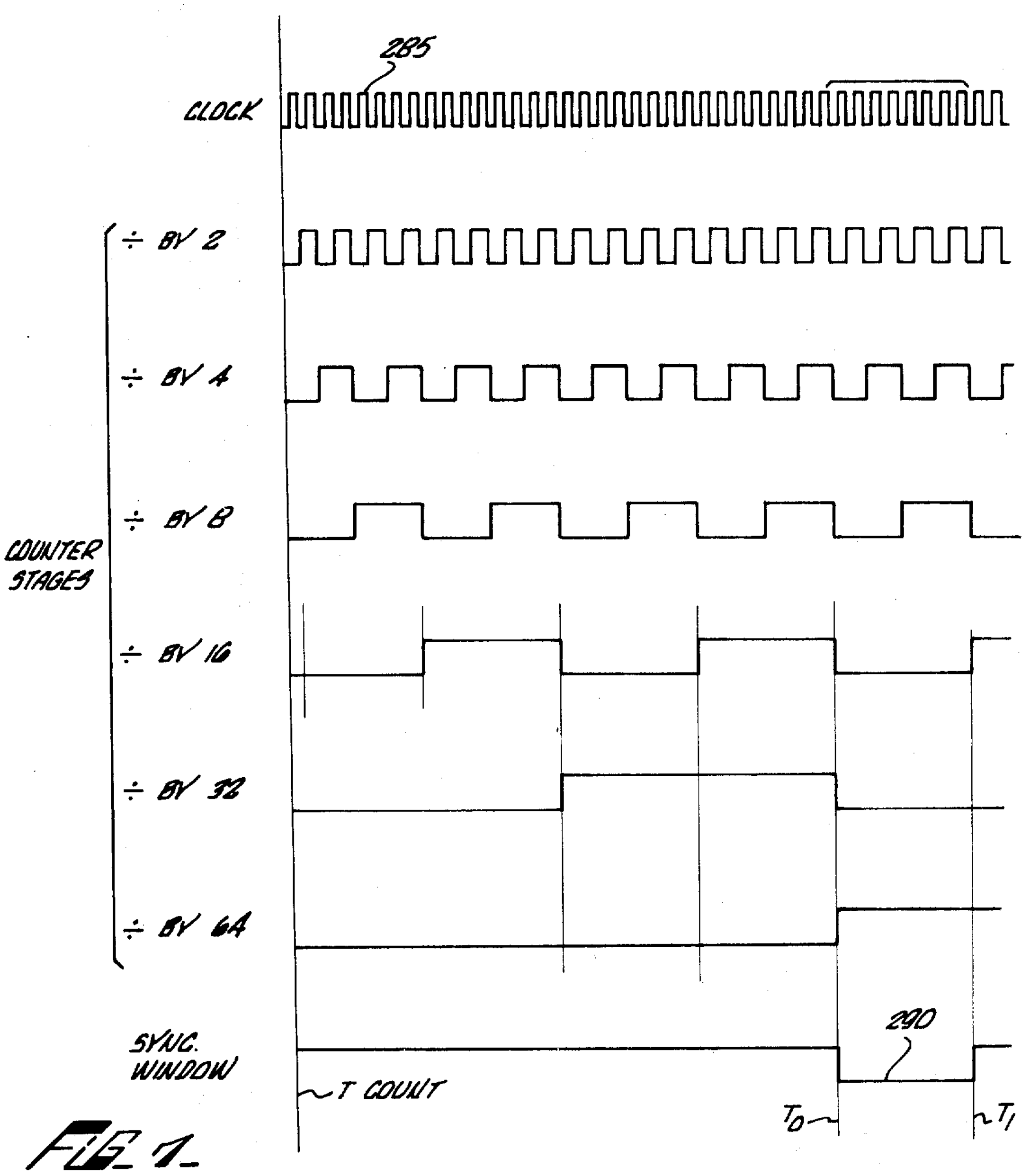
FIG. 7 is a pulse and wave form chart useful in promoting a clearer understanding of the circuitry of certain of the figures herein including FIG. 6.

Counter circuit 108 may be any well-known binary counter which has a plurality of stages that are connected in tandem so that each stage divides its input signal by two. FIG. 7 shows the various divided output signals from stages of counter 108. Three stages, 108A, 108B, and 108C are shown in dashed lines in counter 108, FIG. 6. These three stages are the divide-by-16, divide-by-32, and divide-by-64 states which have the output waveforms shown in appropriately labeled waveforms of FIG. 7. NAND gates 118 and 119 invert the output signals from the divide-by-16 stage 108A and divide-by-32 stage 108B, and apply the inverted signal outputs to another NAND gate 120. NAND gate 120, as is well known, requires HIGH levels at all three input terminals before its output signal will change from a normally HIGH level to a LOW output level. These concurrent HIGH input signals occur at time $T_0$, FIG. 7.

In response to the HIGH levels at time $T_0$, FIG. 7, NAND gate 120 emits a LOW level output. The LOW output from NAND gate 120 persists as long as its input conditions are true, i.e. until time $T_1$, FIG. 7 when the divide-by-16 stage goes HIGH, and is inverted by gate 118. A LOW output signal from NAND gate 120 thus defines a sync window 290 of FIG. 7.

If the counter 108 does not reach its predetermined count as required by the duration of a synchronizing signal 202, then the sync window 290, FIG. 7 does not open. In order to understand why counter 108 will reach its predetermined count only during the presence of a synchronizing signal 202, it is necessary to understand that a HIGH output from gate 127 resets counter 108. A continued LOW output from gate 127 in turn, lets counter 108 continue counting.

The two input conditions from filters 93 and 94 during gap squelch period 201 assure a reset condition for counter 108 just prior to the start of synchronizing signal 202. For example, during gap squelch signal 201 at times $T_m$, FIG. 5, the output signals from both amplifiers 113 and 114 are LOW. The LOW output signal from amplifier 113 is inverted to a HIGH output signal by gate 124, FIG. 6.

Any input signal condition other than two HIGH inputs for NAND gate 125 results in a HIGH output. Thus at time $T_{os}$, FIG. 5, the output from gate 125 is HIGH. Another HIGH input is applied to NAND gate 126 from the normally HIGH output from gate 120. These two HIGH inputs satisfy the conditions for gate 126 and thus the output from gate 126 to gate 127 is a LOW signal. Gate 127, in turn, provides at time $T_{os}$ a HIGH, or RESET, level to counter 108.

At time $T_0$, FIG. 5, the gap squelch signal 201 terminates and synchronizing signal 202 commences. The normally LOW output from amplifier 114 thus goes HIGH at time $T_0$, FIG. 5. In contradistinction, the output signal from amplifier 113 goes LOW at time $T_0$. The output signal from amplifier 113 is inverted to a HIGH signal by NAND gate 124. Accordingly, NAND gate 125 is satisfied at time $T_0$, and its signal from gate 125 is a LOW signal. The output from gate 126 thus goes HIGH to match the other HIGH input at gate 127. The output from gate 127, in response to these two HIGH inputs, drops to a LOW signal. Thus, counter 108 at time T count, (shown in FIG. 5 and FIG. 7) starts counting clock pulses from clock 130. The extended presence of the sync signal 202 allows counter 108 to continue counting. During the counting operation, the various stages of counter 108 accomplish the divider action shown in FIG. 7. Before describing the manner in which a START command pulse is emitted at lead 101, FIG. 6, a protective feature for the sync detector 100 will be described.

Our protective feature, of sync detector 100, is designed to provide assurance that START pulse 257 is detected and is emitted, as a START command without prematurely resetting counter 108. At time $T_0$, FIG. 7, the input conditions at NAND gates 118 and 119 are LOW. The LOW inputs to these gates are inverted for application as HIGH levels to gate 120. The divide by 64 stage output also goes HIGH, thus satisfying NAND gate 120 and allowing its output to go LOW. START pulse 257, FIG. 5, being a HIGH level might reset counter 108 in the manner just described before pulse 257 is sensed and is repeated at lead 101. This possibility is avoided by having window 290 go LOW at least a few clock pulses, 285, FIG. 7, before START pulse 257 is due to appear. The LOW level of window 290 at the output of NAND gate 120 is fed back via lead 121 as an input to gate 126. As just described a LOW condition at either input to gate 126 assures a continued counting operation for counter 108.

The manner in which START pulse 257 is repeated when sync window 290 appears is now described. Window 290 is inverted as a HIGH level to gate 131 and START pulse 257 is the second HIGH level to gate 131, allowing its output to go LOW. The LOW output from NAND gate 131 is inverted by NAND gate 132 as a HIGH input for application to NAND gate 133. NAND gate 133 is the START command output gate. The first clock signal received from the derived clock circuit 95 after the window 290 opens and START signal 257 is present satisfies the HIGH level input conditions for gate 133. Gate 133 thus changes from its normally HIGH output level to a LOW output signal level. This LOW level is employed as a START command.

The above-mentioned START command emitted on lead 101, is also fed back to NAND gate 127. The LOW level of the START command drives the output of gate 127 HIGH, thus resetting counter 108. When counter 108 resets, it closes the sync window 290.

The foregoing operation as just described yields, after the START command is emitted, a new clock output from circuit 95 on lead 103. The clock signal after the START command is at the data frequency rather than at the two-third data frequency as discussed above.

Each one of the parallel tracks recovered from the magnetic tape by the reproduce channels 65A through 65N, FIG. 1, is provided with a sync detector 100 operating in the manner just described. The output terminals 101, 102, and 103 of FIG. 6 are repeated for a plurality of channels in FIGS. 1 and 8. These output terminals 101, 102, and 103 are labeled C, (clock) D, (data) and S, (start) for brevity purposes in FIG. 1. Each channel has its own START command detection gate 66. Each channel also is provided with its own input address circuit 67A, 67B through 67N, its own buffer 68A through 68N, and its own output address circuit 69A through 69N.

Figure 8:
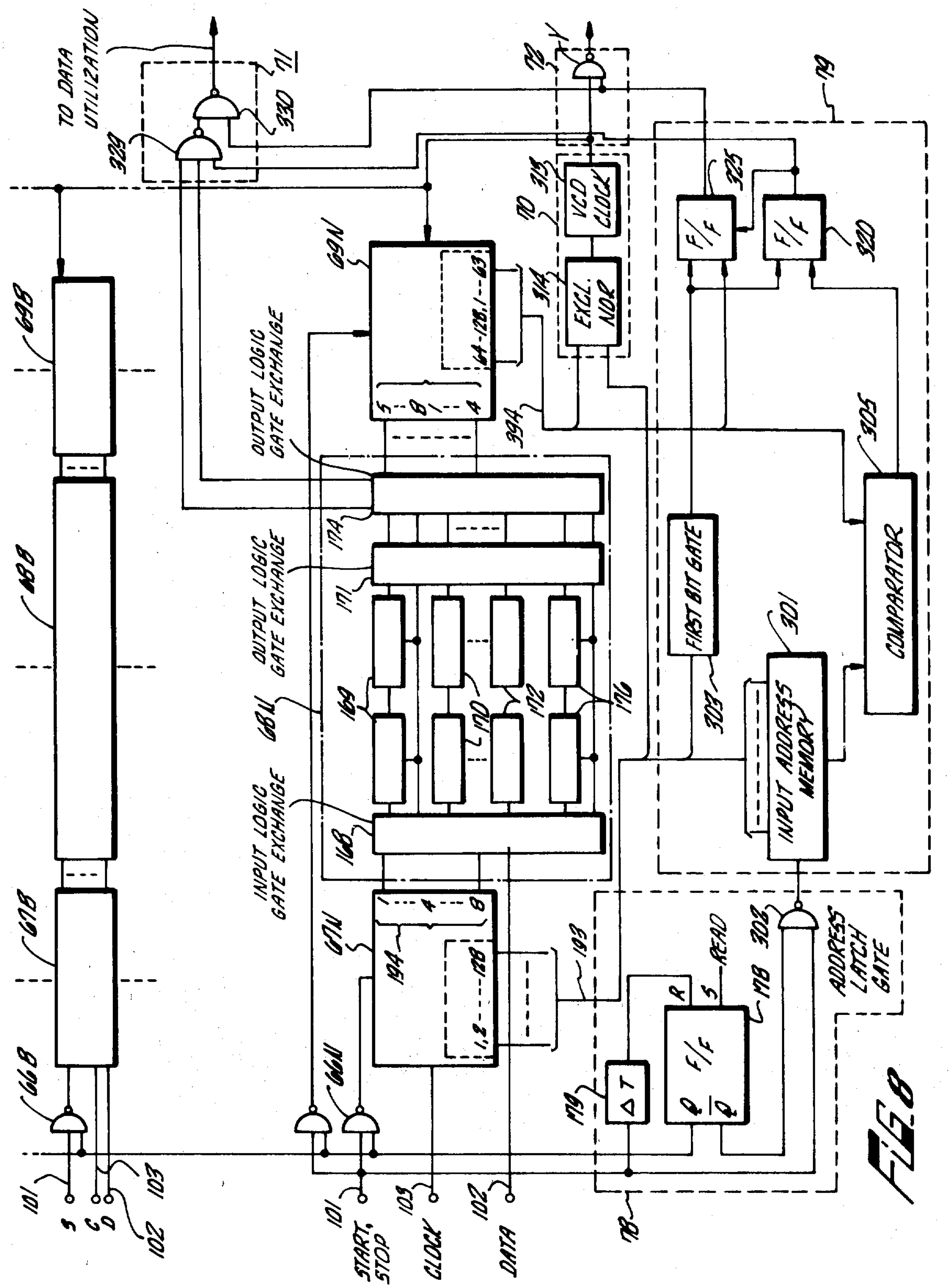
FIG. 8 is a block diagram of a parallel track decoding and buffering system in accordance with the principles of this invention.

In FIG. 8, two channels only are shown although as many as eight or more channels may be provided. The master channel of FIG. 8 is shown in more detail than the other channels. Certain additional equipment is associated with the master channel which additional equipment is not required for the remaining, or slave channels. Operational differences between the master and slave channels will be described in detail hereinafter, following a general summary of the time synchronous parallel track operation of FIG. 1.

Returning briefly to FIG. 1, at the reproduce locations an input sync control circuit 78 is provided. This input sync control 78 assures that the START command for each channel is applied to each channel's own input address circuit 67. Each channel's own input address circuits 67A through 67N respond to the START command, and further respond to the derived clock pulses of its own channel. Address circuits 67 place the decoded data into assigned (i.e., addressed) shift register locations in each channel's buffers 68A through 68N. Each channel is also provided with an output address circuit, such as address circuits 69A through 69N, which address circuits serve to gate out synchronously the first and all successive data bits in a time synchronous parallel format.

The output address circuits 69A through 69N are synchronously controlled by an oscillator clock 70. Oscillator 70 is initiated by and responds to a servo control loop which is related to speed of input and output data at buffer 68N of the master channel.

The sync control circuit 78 is also adapted to respond to a STOP command which appears after the end-of-record synchronizing signal 206, FIG. 3. The STOP command from the master channel is employed by sync control 78 to pulse a memory address control 79. Memory address control 79 latches the master input address 67N when the STOP command is received. The output addressing operation of address circuits 69A through 69N is subsequently stopped by memory control 79 at the exact time when the last bit of actual useable data has been synchronously shifted out of all of the buffers 68A through 68N.

Figure 9:
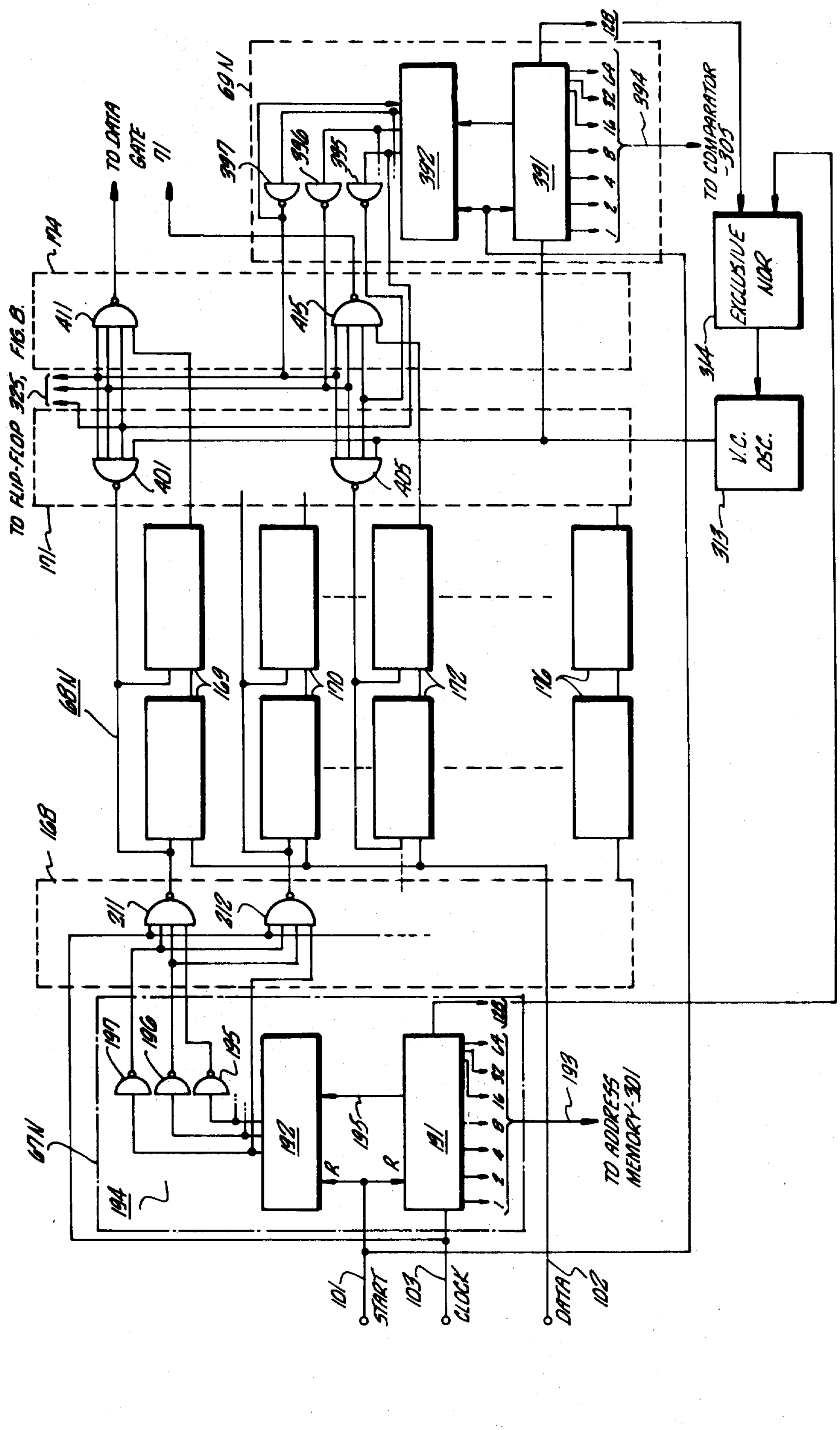
FIG. 9 is a combined block and logic schematic of certain portions of the circuitry of FIG. 8.

Reference is now made to FIGS. 8 and 9 for a more detailed description of the generalized reproduce operation just described.

In FIG. 8 one channel, in addition to the master channel, is shown. It should be understood, however, that there are as many channels provided as there are tracks on the magnetic medium to be recovered.

In FIG. 8 the input sync control circuit 78 of FIG. 1 is shown in dashed lines. It includes a flip-flop circuit 178 which is normally set in a first state. In its normal state flip-flop 178 has an output level at terminal Q which is of proper polarity to enable signal passage through each one of the plurality of synchronizing gates 66. Accordingly, when a START command appears on lead 101 for each channel, that channel's gate passes the START command. The START commands from gates 66 clear input address circuits 67. A derived clock signal present on input lead 103 of the channels, thereafter advances the count of counters located in input address controls 67.

Figure 7A:
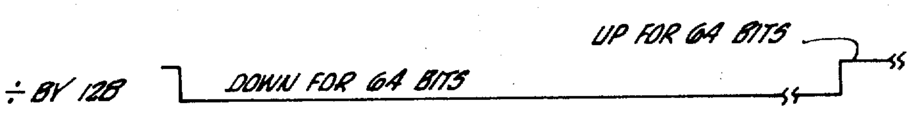
FIG. 7A is a continuation of the pulse division wave forms of FIG. 7 useful in promoting a clearer understanding of FIGS. 8 and 9.

The counter of each address control 67, such as 67N, may be any suitable ring counter. For example, the counter may be comprised of two four-bit binary counters 191 and 192, shown in FIG. 9. Counters 191 and 192 may, for example, be type SN—7493N sold by Texas Instruments, Inc. Such counters, as shown in FIG. 9, each have a plurality of outputs from a series of flip-flops therein. These counters 191 and 192 are interconnected by lead 195 in a known manner so that the input clock signal can be divided in binary steps. Thus, the input clock may be divided by 2, by 4, by 8, etc. through 128. Reference may be made to FIG. 7 and 7A to appreciate a dividing operation from divide by 2 through divide by 128. These counters 191 and 192 have two separate groups of output leads 193 and 194, FIGS. 8 and 9.

As shown in FIG. 8, output leads 194 are connected to an input logic exchange 168. Output leads 193 are connected to an input address memory circuit 301. Each level of the output signal on output leads 193 identifies a data bit address. Output leads 193 and 194 have interrelated signal levels. For example, an output level at lead No. 1 of the output lead plurality 194, FIG. 8, will hold true for sixteen shift pulses, such that sixteen data bits on data line 102 are stored in the first tandem shift register pair 169. While that shifting is taking place, each bit moved into the register pair 169 is identified by an appropriate level on a similarly identified lead associated with the plurality of output leads 193.

A first bit gate 303 responds to the first bit level from lead No. 1 of plurality 193 by pulsing a flip-flop 325. Flip-flop 325 when pulsed assumes a state that emits an output signal of proper polarity to inhibit NAND gate 330. With NAND gate 330 inhibited, output signals from NAND gate 329 are prevented from reaching the data utilization circuit 80, FIG. 1. It should be understood that the same START command that started counting, or sequencing, in the input address circuit 67N also starts counting, or sequencing, in the output address circuit 69N. Accordingly, while data bits are being loaded from data line 102 into buffer 68N via input logic exchange 168, noise is being shifted out of buffer 68N through output logic gate exchanges 171 and 174 under control of output address circuit 69N. These noises signals, since they are not delivered to the utilization circuitry do not adversely affect the system operation.

Before discussing in more detail the loading and unloading of the buffers such as buffer 68N, reference is made to the input address memory circuit 301. Input address memory circuit 301 monitors the output levels on leads 193 in order to follow, on a bit-by-bit basis, the progress of data storage into the tandem shift register pairs 169, 170, through 176. An address comparator circuit 305 is connected to the input address memory 301.

The input address memory 301, FIG. 8, stores the input address present on the input address lines 193 and performs gap squelch compensation, when latched up by an output from address latch gate 302. The address latch gate 302 generates a latching output at recognition of the end-of-message synchronizing signal. Comparator 305 thereafter compares the address of the last useable data bit from the input address memory 301 with the output address lines 394 until the last useable data bit is outputted. After that last bit is outputted, comparator 305 sets flip-flop 320. When flip-flop 320 sets the data output gate 329 is inhibited.

As mentioned above, input address memory 301 must compensate for the known number of bits in gap squelch signal 205, the end-of-message synchronizing signal 206 and the data finished signal 207. Such compensation is required because noise is being stored in the buffer 68N while the end-of-message synchronizing signal is being decoded by sync detector 100, FIG. 6. The end-of-message synchronizing signal for the system format 200, FIG. 3, is the same duration as the start-of-message synchronizing signal. It should be understood, however, that without departing from our invention, these two synchronizing signals may be of different durations. If different duration synchronizing signals are provided those systems utilizing forward and reverse read operations would require separate output signals from sync detector 100 as START and STOP commands. Gap squelch signal 205, which assures coherency between the last data signal and synchronizing signal 206 may be dispensed with by recording the data so the last data bit boundary coincides with the first synchronizing signal bit cell boundary.

In the embodiment of FIG. 8, the time delay circuit 179 is chosen of sufficient duration that all channels receive their START commands. Time delay 179 then resets flip-flop 178 to a state which primes address latch gate 302. When the STOP command emitted by sync detector 100, FIG. 6, appears on lead 101, address gate 302 is satisfied. Gate 302 emits a signal which latches up the input address memory 301. In the example given for the system format 200, the input address memory will be advanced by N multiples of three data clock cycles. In other words, the input address in memory 301 indicates a total number of bit positions for buffer 68N which number is in excess of the actual useable data bits. As described earlier the synchronizing signals may be of a duration equivalent to 24 bit positions. This excess 24 bit reading in input address memory 301 is subtracted in any known manner before the address is read by the comparator 305. Comparator 305 includes a counter not shown that waits for the output address memory to correspond to the last useable bit address read out from memory 301 before comparator 305 sets flip-flop 320 to inhibit further data readout from data gate 71, as previously described.

Figure 9A:
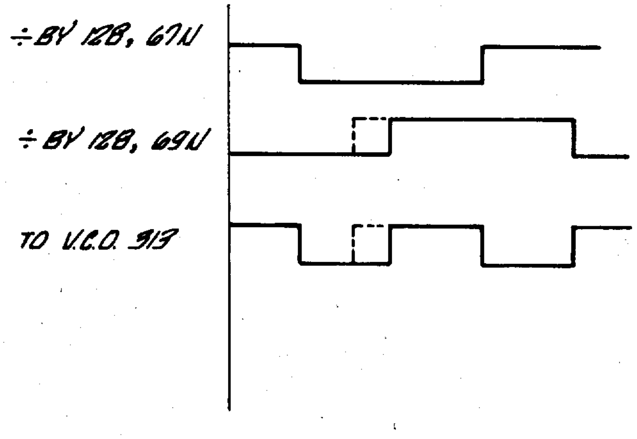
FIG. 9A is a pulse chart useful in promoting a clearer understanding of the servo-controlled clock features of FIGS. 8 and 9.

Responsive to the START command the plurality of output leads 394 of address circuit 69N, FIG. 8, commence shifting noise from the fifth tandem connected pair of shift registers in buffer 68N. Accordingly, output addressing circuit 69N starts unloading the last half of buffer 68N while input address circuit 67N is loading the first half of buffer 68N, as will be described in more detail hereinafter. A voltage-controlled oscillator 313 is normally set to run at approximately the desired data frequency. Its output frequency is varied about the data frequency in response to a voltage control signal emitted by an exclusive NOR circuit 314. The input signals for the exclusive NOR circuit 314 are obtained from the divide by 128 outputs from input and output address circuits 67N and 69N respectively. These input signals are 180° out-of-phase as is shown by FIG. 9A. The output signal from exclusive NOR circuit 314 controls the frequency of oscillator 313. If both the addressing circuits 67N and 69N are operating at the same speed, oscillator 313 holds its frequency output stable. If, on the other hand, output which addressing circuit 69N tends to run faster than the input addressing circuit 67N, then its divide by 128 level goes up sooner as shown in dashed lines in FIG. 9A. The exclusive NOR circuit 314, in turn emits a shorter pulse which tends to slow down the output frequency of oscillator 313. The output signal from oscillator 313 sequences all of the output addressing circuits including the master channel 69N and the slave channels such as 69B.

Since the master channel is the controlling channel its buffer 68N will substantially maintain its half-full status. In the other channels, however, that channel's START command may be several bits ahead or behind the START command for the master channel. The START command for any other given channel does not sequence that channel's output address circuit. Instead all channel's output address circuits are sequenced along with the master channel in the manner just described. For these reasons, some of the other channel's buffers may be more or less than the ideal half-full status for the master channel.

Certain components of FIG. 8 are repeated in more detail in FIG. 9. The plurality of output leads 194 are derived by various combinations of counter output levels emitted by counters 191 and 192. Connected to the outputs of counter 192, FIG. 9, are three NAND gates 195 through 197. Various combinations of the output levels from gates 195 through 197, together with additional opposite polarity levels of output leads from counter 192, are applied as gating control signals to the various gates (such as 211 and 212) of exchange 168. Exchange gates 211, 212, etc., all receive in common a derived clock from lead 103. Data on lead 102 is applied in common to the input stage of all of the tandem shift register pairs 169, 170, etc. The first shift register pair 169 has 16 stages for storing 16 data bits from lead 102. Immediately after the START command is detected on lead 101, and counters 191 and 192 starting counting, the gates 195 through 197 apply an enabling signal to gate 211. Gates 195 through 197 are controlled by counter 192 so as to assure application of 16 shift pulses via clock lead 103 through enabled NAND gate 211 to the shift register pair 169. After 16 shifts the divide by 16 stage changes level, thereby disabling gate 211. At that instant gate 212 is enabled by an output from counter 192. For the next 16 clock pulses, shift register pair 170 stores the next 16 data bits through well known gating as just described. This shift-controlling operation from gate 211 to gate 212, etc. on through all eight gates of exchange 168 (six of which are not shown in FIG. 9) continues for storage of data in all of the shift register pairs.

It was explained above that data is stored in 16 bit words in the first half of buffer stages 68N. Concurrently therewith the second half of the buffer stages are being unloaded under control of counters 391 and 392 of output address control 69N. As mentioned earlier, counters 391 and 392 start the shifting operation described above at the fifth shift register pair 172. The loading of shift register pair 169 and the unloading of shift register pair 172 in the master channel thus take place simultaneously, as described hereinafter.

The logic gates of exchanges 171 and 174 are hooked back-to-back. Output signals from each shift register pair are applied to individually associated register output gates 411, 415, etc. of exchange 174. Gates 395 through 397 are connected to gate pair 401, 411; gate pair 405, 415 and to other gate pairs (not shown) and associated with shift register pairs 173–176, also not shown. Gate 405 clocks data out while gate 415 serially advances the data to the data output gate 71. The connections of gates 395 through 397 for gate 405 are the same as the connections of gates 195 through 197 to gate 211. Accordingly, counters 391 and 392 are shifting signals out of register pair 172 at the same time that counters 191 and 192 are shifting data into register pair 169. The output stage of register pair 172 is applied as an input lead to gate 415 of exchange 174. Gate 415 is enabled at the same instant that gate 405 is enabled.

Initially there are no data bits present in shift register pairs 172 through 176. Instead noise signals are shifted out of these register pairs while data bits are being loaded into the 4 register pairs 169 through 172. Such noise signals are blocked from reaching the utilization circuitry because output gate 71 is inhibited in the manner previously described with respect to FIG. 8.

As counter 391 and 392 continue sequencing, gates 401 and 411 will become enabled for a duration of 16 shift pulses from oscillator 313. At the instant that these gates are enabled flip-flop 325, FIG. 8 is reset. When flip-flop 325 is reset, gate 330 of data output gate 71, FIG. 8, is enabled. Flip-flop 325 holds that state as all other shifting sequences continue. Flip-flop 325 also enables gate Y, FIG. 8, so that data bits and clock signals are available to utilization circuitry. Both data bits and clock signals are delivered to the utilization circuitry until all data bits have been shifted out of all other channels. Comparator 305, as explained earlier, resets flip-flops 320 and 325 to inhibit any further data or clock signals from reaching the utilization circuitry. The described operation then repeats when another START command following a beginning-of-message synchronizing signal is received and decoded.

The subject invention has been described with reference to certain preferred embodiments; it will be understood by those skilled in the art to which this invention pertains that the scope and spirit of the appended claims should not necessarily be limited to the embodiments described, as certain typical replacements and refinements have been mentioned hereinbefore.

What is claimed is:

1. A system for formatting signal storage on a magnetic medium having at least one recording track in which binary data is to be stored at a fixed repetitive bit cell duration rate, said system comprising:

means recording, prior to data to be stored in said one recording track, a plurality of start of message synchronizing signals having a fixed and repetitive bit cell duration rate which is different from the fixed repetitive rate for the data;

means for coherently recording in said track at least one start signal of a selected binary value at said data rate immediately following said synchronizing signal; and means for coherently recording after said start signal random binary data to be written in said track at said data rate.

2. A system in accordance with claim 1 wherein said signals recorded on said track are in split-phase mark form, such signals being characterized in that said synchronizing signals comprise:

a continuous signal having signal level transitions at the bit cell boundaries and an additional level transition substantially at the middle of a bit cell at said synchronizing signal rate; and said start signal also comprises a continuous signal coherent with the last trailing edge of said synchronizing signal and also having signal level transitions at said bit cell boundaries and an additional level transition substantially at the middle of a bit cell at said data rate.

3. The system of claim 1 further comprising:

means for reproducing the recorded signals;

first means for delaying said reproduced signals by one bit cell duration at said data rate; and second means for delaying said reproduced signals by 1½ bit cell durations at said data rate.

4. The system of claim 3 wherein said synchronizing signals have a repetitive bit cell duration equal to 1½ times the bit cell duration at said data rate.

5. The system of claim 4 further comprising:

decoding means at the reproduce location, said decoding means comprising first and second phase comparison means, said first phase comparison means receiving as inputs the reproduced signals and the same reproduced signals delayed by one data bit cell duration whereby said first phase comparison means has a two discrete level output pattern corresponding respectively to said decoded synchronizing and start signals, said second phase comparison means receiving as inputs the reproduced signals and the same reproduced signals delayed by 1½ data bit cell durations, said first and second phase comparison means further providing a unique output pattern when decoding said synchronizing and start signals.

6. The system of claim 5 further comprising:

first and second filter means, said first filter means receiving the output of said first phase comparison means, said second filter means receiving the output of said second phase comparison means.

7. The system of claim 6 further comprising:

first detection means receiving the outputs from said first and second filter means for detecting the presence of said unique output pattern, said detection means further adapted to thereafter emit a START command upon receiving said START signal.

8. The system of claim 7 wherein the start and random data signals are in split-phase mark format such that a one bit delayed version of itself compares with like phases for durations substantially equal to a bit cell interval and/or compares with opposite phases for durations substantially equal to a bit cell interval, and further comprising:

means including said first delay means and said first phase comparison means for emitting one data level for like phases and another data level for opposite phases in the compared signal;

derived clock means for deriving, from selected transitions of the split phase mark signals, a clock signal synchronized with the decoded data levels;

shift register means having an input and an output portion; and input address means response to the output of said clock means, the start signal and the decoded output data signal from said data level emitting means, for placing the decoded data into assigned shift register locations in the input portion of said shift register means.

9. The system of claim 8 further comprising:

output address means for gating out the data bits from the output portion of said shift register means;

speed comparison means for comparing the speed at which input data bits fill said input portion of the shift register means with the speed at which data bits are outputted from the output portion of said shift register, said speed comparison means providing a voltage output indicative of the relation of said compared speed; and means connected to said output address means and responsive to said speed comparison means for varying the rate at which data is outputted from said shift register means, whereby said output portion of said shift register means may be substantially maintained at a predetermined partially filled level.

10. The system of claim 9 further comprising:

means for coherently recording a plurality of end of message synchronizing signals immediately subsequent to the last data signal, said synchronizing signals having a fixed and repetitive bit cell duration rate which is different from the fixed repetitive bit cell duration of the data rate; and means for coherently recording a STOP signal immediately subsequent to said plurality of end of message synchronizing signals, said STOP signal comprising at least one binary value of a given signal in said split-phase mark format at said data rate.

11. The system of claim 10 further comprising:

comparator means responsive to said end of message synchronizing signal and said STOP signal for preventing the outputting from the output portion of said shift register means when the first bit of nondata signal is shifted into the last output stage of the output shift register means.

12. In a memory system having at least one record channel, at least one reproduce channel and a magnetic storage medium, data bit cell duration defining means for emitting a repetitive cycle of data intervals at a fixed predetermined data rate;

means for recording in split phase format at least a pair of signals of known binary valves continuous with and one each of said pair bracketing in time a synchronizing signal;

synchronizing signal emitting means associated with said bit cell duration defining means for coherently emitting after the first signal of said pair a plurality of synchronizing signals having a repetitive bit cell duration different from said data bit cell duration; and means for coherently inhibiting said synchronizing signal emitting means when a selected synchronizing signal bit cell boundary coincides with a selected data interval bit cell boundary of the second signal of said pair.

13. The system of claim 12 wherein the synchronizing signal is also in a split phase mark format of a known binary value and wherein said synchronizing signal bit cell duration is equal to 1½ times the data bit cell duration.

14. The system of claim 13 further comprising:

decoding means at the reproduce location receiving the data and synchronizing signals for converting the data signals to two-level binary signals, said decoding means producing a unique output pattern upon receiving said synchronizing signals.

15. A method of recording and recovering high bit density in a magnetic memory system including a magnetic medium, and a record and reproduce channel comprising the steps of:

recording serial binary data on said medium in a split phase mark format with a fixed data bit cell duration;

recording coherently a synchronizing signal prior to recording the serial binary data, with a bit cell duration different from the data bit cell duration;

recording coherently a start signal after recording the synchronizing signal but before recording the binary data, with a bit cell duration equal to the data bit cell duration;

recovering the recorded signals from the magnetic medium;

delaying the recovered signals by one data bit cell duration; and delaying the recorded signal by 1½ data bit cell durations.

16. The method of claim 15 further comprising the additional steps of:

comparing the recovered signals with the recovered signals delayed by one data bit cell duration; and comparing the recovered signals with the recovered signals delayed by 1½ data bit cell durations.

17. A system for formatting signal storage on a magnetic medium having at least one recording track in which binary data is to be stored in split phase mark form having a fixed repetitive bit cell duration rate, said system comprising:

means recording, prior to data to be stored in said one recording track, a plurality of start of message synchronizing signals of known binary values in split-phase mark form having a fixed and repetitive bit cell duration rate which is different from the fixed repetitive rate for the data;

means for coherently recording in said track at least one start signal of a selected binary value in split-phase mark form at said data rate immediately following said synchronizing signal; and means for coherently recording after said start signal random binary data to be written in said split-phase form at said data rate.

18. A system in accordance with claim 17 wherein:

said fixed repetitive bit cell rate of said synchronizing signals is a definite ratio as compared with said data bit cell rate.

19. A system in accordance with claim 18 wherein said definite ratio for said synchronizing rate is two-thirds of the data rate.

20. A system in accordance with claim 19 and further comprising:

means for reproducing signals recorded on said track of said magnetic medium; and means responsive to said ratio and the coherency between said synchronizing signals and said start signal for emitting a data recovery command concurrently with recovery of said random binary data by said reproducing means.

21. A system in accordance with claim 20 wherein said data recovery command emitting means comprises:

first means for decoding said synchronizing signals as one fixed signal level for a given time duration and said start signal as a second different signal level following said given time duration;

second means for decoding said synchronizing signals as said second different signal level greater than the given time duration and the time required for the start signal; and means responsive to coincidence of both of said second levels for emitting said data recovery command.

22. A system in accordance with claim 21 wherein said first decoding means comprises:

a delay equal to the duration of a bit cell as said data rate; and further comprising first comparator means connected to receive said reproduced signal and said signal from said first delay means for emitting said first and second signal levels for said synchronizing and start signal respectively.

23. A system in accordance with claim 22 wherein said second decoding means comprises:

a delay equal to the duration of a bit cell at said synchronizing rate; and further comprising second comparator means connected to receive said reproduced signal and said signal from said second delay means and responsive to the received signals for emitting said second signal level throughout the time duration of the synchronizing signal and said start signal.

24. A system in accordance with claim 23 wherein said second delay means has a time delay that is equal to 1½ times the time duration of a bit cell at said data rate.

25. A system in accordance with claim 23 where said first and second comparison means comprises exclusive NOR circuits.

26. A system for recovering signals formatted in accordance with claim 17 comprising:

first decoding means for decoding said start of message synchronizing signals as one fixed level;

second decoding means for decoding said start of message synchronizing signals as a second fixed level;

a synchronizing detector connected to receive said first and second fixed levels and responsive to said start signal for emitting a start command; and means associated with said synchronizing detector and responsive to said start command for emitting a data read signal concurrently with the appearance of the first signal of random data to be recovered from the track of said medium.

27. A system in accordance with claim 17 and further comprising:

means for coherently recording in said one track prior to said start of message synchronizing signals at least one noise squelching signal of a selected binary value in split-phase mark form at said data rate.

28. A system in accordance with claim 17 and further comprising:

means for coherently recording between said random data pattern and said end of message synchronizing signals at least one noise-squelching signal of a selected binary value in split-phase mark form at said data rate.

29. A system for formatting signal storage for a magnetic medium accordance with claim 17 and further comprising:

means for coherently recording, in said track following said random data, a plurality of end of message synchronizing signals having a fixed and repetitive bit cell duration rate which is the same as that of the start of message synchronizing signals; and means for coherently recording in said track after said end of message synchronizing signals a stop signal of a selected binary value in split phase mark form at said data rate.

30. In a magnetic memory system having at least one record channel, at least one reproduce channel and a magnetic storage medium, said system being adapted to record on said magnetic storage medium random serial binary data represented in a split phase mark format having a fixed and repetitive data bit cell rate:

means recording a plurality of synchronizing signals prior to recording the data, said synchronizing signals having a fixed repetitive bit cell rate which is different from the data bit cell rate;

means synchronizing a last boundary transition of the synchronizing signal substantially coincidental and continuous with a first boundary transition of a signal to be recorded immediately after said synchronizing signal;

means responsive to said synchronizing means for recording at least one START signal in split phase mark form immediately at said boundary transitions immediately before the random serial data signals to be recorded; and means responsive to the differences in the bit cell rates and the coherency of the synchronizing signals and said START signal for emitting a data recovery command coincidental with the appearance of said random serial binary data to be recovered from said medium.

31. In a high density system having a plurality of parallel tracks of data recorded on a magnetic storage medium with spacial displacement of each tracks first and subsequent data signals relative to all other tracks first and subsequent data signals, said spacial displacement being at least more than the spacial allotment of one data bit period and in some instances being more than the spacial allotment of many data bit periods as a result of dynamic and static skew and other disturbances inherent in the system, the improvement comprising:

means for recording synchronizing signals on each track on the magnetic medium in a split-phase format which assures signal transitions at a midbit location and at each bit cell boundary at a first fixed repetition rate;

means for coherently recording between data to be recorded and the synchronizing signal on each track at least one binary signal of a given bit designation in said split phase form at a second rate different from said first repetition rate;

means at the reproduce location for reproducing the recorded signals from each individual track;

means for delaying the reproduced signal by one bit cell duration at both the first and second repetition rates;

first means individual for each track and associated with said first rate for decoding a delayed and nondelayed reproduced signal as one continuous level for the duration of the synchronizing signal;

second means individual for each track and associated with said second rate for decoding a delayed and nondelayed reproduce signal as a second continuous level for the duration of the synchronizing level; and means responsive to said first and second means and a change in said level outputs thereof upon occurrence of said binary signal for emitting a start command just prior to the occurrence of data signals to be recovered from said medium.

32. The system in accordance with claim 31 wherein the first means comprises a first signal comparison means and the second means comprises a second signal comparison means;

said system further comprising:

means for applying a reproduced signal and the same reproduced signal delayed by one data bit cell duration at said first rate to said first signal comparison means for emitting a first one of the two discrete level output signals;

means for applying to said second signal comparison means a reproduced signal and the same reproduced signal delayed by one bit cell durations at said second repetition rate for emitting a second one of said two discrete level output signals; and said start signal emitting means comprises a logic gating means responsive to said difference in output levels and a change therein for emitting said start command.

33. The system in accordance with claim 31 and further comprising:

means for designating one of the recorded tracks as a master track;

derived clock means for deriving from selected transitions of the split-phase mark signals of said master track a clock signal synchronized with the decoded data levels for said master track;

shift register means individual to each track with each shift register means having an input and an output portion;

means individual to each track and responsive to a start command for each track for serially shifting decoded data from that track into its associated input portion of that tracks shift register asynchronously relative to said other tracks; and means responsive to the master tracks derived clock signal for synchronously shifting data in parallel from all output portions of all shift registers for all tracks.